United States Patent Office 2,907,722
Patented Oct. 6, 1959

2,907,722

COMPOSITION COMPRISING METHYL METHACRYLATE POLYMER, NITROCELLULOSE, REACTION PRODUCT OF A BISPHENOL AND A DICARBOXYLIC ACID AND SOLVENT, PROCESS FOR PREPARING SAME AND ARTICLE COATED THEREWITH

Dimitrios Nickolas Staicopoulos, Drexel Hill, Pa., assignor to E. I. du Pont de Nemours and Company, Wilmington, Del., a corporation of Delaware No Drawing. Application March 11, 1957
Serial No. 644,992

8 Claims. (Cl. 260—17)

This invention relates to coating compositions and more particularly to craze-resistant methyl methacrylate lacquers.

Methyl methacrylate lacquers, that is, coating compositions containing solvent and as the principal film forming constituent a polymer of methyl methacrylate, have been applied to a variety of substrates such as, for example, automobile bodies. Dried coatings of these methyl methacrylate lacquers have had many outstanding properties, particularly durability and gloss retention. Generally, however, dried coatings obtained from known methyl methacrylate lacquers have very poor resistance to crazing. Crazing refers to a multiplicity of cracks which appear in baked methyl methacrylate lacquer coatings when they come in contact with solvent materials as occurs, for example, when blemishes in baked methyl methacrylate coatings are refinished or when a second coating is applied over the original coatings.

I have discovered a craze-resistant methyl methacrylate lacquer composition. The composition of this invention comprises solvent and (A) about from 40 to 75 parts by weight of a polymer of methyl methacrylate having a relative viscosity of about from 1.117 to 1.196, (B) about from 0 to 25 parts by weight of plasticizer for the polymer of methyl methacrylate, (C) about from 5 to 20 parts by weight of lacquer-grade nitrocellulose and (D) about from 20 to 50 parts by weight of the heat reaction product of 1 molar portion of at least one of the group consisting of aliphatic dicarboxylic acids having 4 to 10 carbon atoms and acid chlorides and anhydrides thereof with at least about 1.5 molar portions of at least one compound which forms an ester therewith selected from the group consisting of bisphenols and acetates thereof. Preferably, the composition of this invention comprises solvent and (A) about from 50 to 70 parts by weight of a polymer of methyl methacrylate having a relative viscosity of about from 1.117 to 1.196, (B) about from 10 to 20 parts by weight of plasticizer for the polymer of methyl methacrylate, (C) about from 5 to 10 parts of lacquer grade nitrocellulose and (D) about from 20 to 30 parts by weight of the reaction product of 1 molar portion of at least one of the group consisting of aliphatic dicarboxylic acids having 4 to 10 carbon atoms and acid chlorides and anhydrides thereof with about from 1.5 to 2.0 molar portions of at least one compound which forms esters therewith selected from the group consisting of bisphenols and acetates thereof.

The polymers of methyl methacrylate useful in making the methyl methacrylate lacquers of this invention are either homopolymers of methyl methacrylate or copolymers of methyl methacrylate with minor amounts, for example, in the order of 2 to 25% by weight of another material copolymerizable therewith, for example, acrylic acid, methacrylic acid, the 1 to 4 carbon alkyl (i.e. methyl to butyl) esters of acrylic acid, the 2 to 4 carbon alkyl (i.e. ethyl, propyl and butyl) esters of methacrylic acid, vinyl acetate, acrylonitrile and styrene. A preferred copolymer contains about 98% by weight of methyl methacrylate and 2% by weight of methacrylic acid. Copolymers of 80 to 98% by weight of methyl methacrylate with 20 to 2% by weight of glycidyl methacrylate can also be used.

The term "polymer of methyl methacrylate" and related terms, as used herein, refer to such homopolymers and copolymers as well as mixtures of homopolymers, mixtures of copolymers, and mixtures containing both homopolymers and copolymers.

The methyl methacrylate polymers used in the methyl methacrylate lacquers are those having a relative viscosity of about 1.117 to 1.196. Methyl methacrylate topcoat lacquers based on such polymers are disclosed and claimed in copending application Serial No. 434,661, filed June 4, 1954, by Laverne W. Crissey and John H. Lowell, and copending application Serial No. 629,454, filed December 20, 1956, by D. N. Staicopoulos. Still other methyl methacrylate topcoat lacquers containing such polymers which are particularly adapted to convenient spray application are disclosed and claimed in copending application Serial No. 402,498, filed January 6, 1954, by Laverne W. Crissey and John H. Lowell.

The term "relative viscosity," as used herein to specify a property of polymers of methyl methacrylate, is the value obtained by dividing the efflux time of a solution, A, of the polymer of methyl methacrylate by the efflux time of the solvent, B, used in the solution, the efflux times being measured in accordance with the procedure of A.S.T.M.–D–445–46T, method B. The polymer solution, A, is a solution of 0.25 gram of the polymer of methyl methacrylate being tested in 50 milliliters of ethylene dichloride, and the solvent, B, is ethylene dichloride. The efflux times are determined at 25° C. in a standard apparatus currently marketed under the designation of modified Ostwald viscosimeter, series 50.

The polymers of methyl methacrylate used in making the methyl methacrylate lacquers can be prepared according to well known methods by polymerizing methyl methacrylate monomer with or without another monomer copolymerizable therewith either in bulk, in solution, or in granular form to produce products having the required relative viscosity.

Any of the plasticizers for polymers of methyl methacrylate can be used in the methyl methacrylate lacquer. Such plasticizers includes, for example, benzyl butyl phthalate, dibutyl phthalate, triphenyl phosphate, 2-ethylhexyl benzyl phthalate, and dicyclohexyl phthalate. Benzyl butyl phthalate yields coatings having a particularly good overall balance of properties.

The lacquer-grade nitrocellulose used in the coating composition of this invention can be any of the wide variety commonly employed in nitrocellulose lacquers. The most common characteristic used to define the nitrocellulose is viscosity. The most widely used grades have viscosities of one-quarter second to five seconds. These are the most useful grades for this invention although mixtures containing small proportions of grades having viscosities as high as fifty or one hundred seconds can also be used. The one-quarter second viscosity corresponds to about 50 centipoises when measured as a 12.2 percent solution in the solvent mixture defined as Formula A in A.S.T.M.–D301–54T. On the same basis, five seconds corresponds to about 1800 centipoises, fifty seconds to about 18,000 centipoises, and one hundred seconds to about 38,000 centipoises.

The methyl methacrylate lacquer also must contain the reaction product of 1 molar portion of an aliphatic dicarboxylic acid having 4 to 10 carbon atoms per molecule or an acid chloride or anhydride thereof with at least about 1.5 and preferably about 1.5 to 2.0 molar portions of a bisphenol or an acetate thereof.

Molar portion as used here refers to the mole ratio of the reactants; that is, the mole ratio of the acid or derivative thereof to the bisphenol or derivative thereof must be less than about 1:1.5 and preferably from 1:1.5 to 1:2. The mole ratio of the reactants may be as low as 1:8; however, in this case the excess bisphenol or derivative thereof must be separated from the reaction mixture before the polyester product is used in the methyl methacrylate lacquer.

Suitable acid, acid chloride and anhydride reactants include, for example, succinic acid, adipic acid, suberic acid, sebacic acid, $\alpha,\beta$-dimethyl succinic acid, maleic acid, glutaconic acid, adipyl chloride, suberyl chloride, sebacyl chloride, $\alpha,\beta$-dimethyl succinyl chloride, maleic anhydride and mixtures thereof.

The bisphenols which are reacted with the acidic component are polynuclear phenols which can be represented by the general formula:

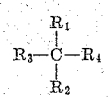

wherein $R_1$ is selected from the class consisting of hydrogen and alkyl radicals of from 1 to 4 carbon atoms, $R_2$ is selected from the class consisting of hydrogen, cyclohexyl, and alkyl radicals of from 1 to 4 carbon atoms and $R_3$ and $R_4$ are hydroxyphenyl radicals or monoalkylated hydroxyphenyl radicals having 1 to 3 carbon atoms per alkyl group. These bisphenols include for example, bis-(4-hydroxyphenyl)-2,2-propane, bis-(4-hydroxyphenyl) 2,2 - butane, bis - (4 - hydroxyphenyl)-1,1 - ethane, bis - (4 - hydroxy - 3 - methylphenyl) - 2,2-propane, bis-(4-hydroxyphenyl) cyclohexyl methane and mixtures thereof.

Monoacetates or diacetates of the bisphenols such as, for example, the mono- or diacetate of bis-(4-hydroxyphenyl)-2,2-propane, can be used in place of or with the aforementioned bisphenols.

The aforementioned reaction products are hydroxyl terminated polyesters. One preferred method of preparing the esters is to heat one of the bisphenols, preferably with a small portion of solvent, such as, for example, xylene, toluene, benzene, hexane or decane, then slowly add one of the aforementioned acid chlorides to the reaction mixture. The reactants are held at about from 50 to 120° C. and preferably 80 to 100° C. until all the hydrochloric acid by-product is driven off; usually this takes about from 1 to 5 hours. An amine such as pyridine can be added to the reaction mixture to take up the hydrochloric acid. The resulting hydrochloride is then removed by washing the reaction mixture with water.

Another preferred method of making the ester reaction product is to mix the bisphenol with acetic anhydride in about a 1:1 mole ratio, then heat the mixture at 100 to 200° C. and preferably 140 to 160° C. until acetic acid is no longer evolved from the reaction mixture. The resulting product is principally the monoacetate of the bisphenol. Next, the aliphatic dicarboxylic acid is added to the monoacetate and the resulting mixture is held at up to 250° C. and preferably at 150 to 220° until acetic acid is no longer evolved from the reaction mixture.

Another alternative procedure is to react the bisphenol with an excess acetic anhydride at a temperature of about 100 to 200° C. thereby forming the diacetate of the bisphenol. Heating is continued until the unreacted acetic anhydride and the acetic acid by-product are no longer evolved from the reaction mixture, then one more mole of bisphenol is added to the mixture for every mole of the diacetate and heating is continued for several hours until the system comes to equilibrium. The resulting product is the monoacetate of the bisphenol. The monoacetate is then reacted with the aliphatic dicarboxylic acid as described above.

Another alternative method is to react acetic anhydride with one of the 4 to 10 carbon atom aliphatic dicarboxylic acids, thereby forming a mixed anhydride and driving off acetic acid. This material is then reacted with the bisphenol to form the esters useful in this invention.

The bisphenol may also be reacted directly with the 4 to 10 carbon atom aliphatic dicarboxylic acid thereby splitting off water and forming the hydroxyl terminated ester. This is done by melting the bisphenol and adding the 4 to 10 carbon atom aliphatic dicarboxylic acid to the bisphenol. Since this reaction takes about from from 2 to 10 hours at 250° C., an esterification catalyst such as, for example, litharge, lime or toluene sulfonic acid is preferably added to the reaction mixture.

Examples of volatile solvents and diluents which can be used in formulating the methyl methacrylate lacquer compositions are toluene, xylene, butyl acetate, acetone, methyl isobutyl ketone, butyl ether, and other aliphatic, cycloaliphatic and aromatic hydrocarbons, esters, ethers, ketones and alcohols such as are conventionally used in coating compositions.

Conventional lacquer modifiers such as pigments, inhibitors, dispersing agents, flow-control agents and the like can also be added to the composition of this invention. Examples of pigments include carbon blacks, silica, china clay, talc, organic dyestuffs and lakes thereof, metal flake pigments and various metallic oxides, hydroxides, chromates, silicates, sulfides, sulfates and carbonates. The pigments are included in proportions normally used in coating compositions.

The various ingredients of the coating compositions of this invention can be brought together in any desired manner by conventional lacquer formulating techniques to form the finished coating compositions. If a pigmented mixture is used, it is often convenient to form a mill base of the pigment, nitrocellulose and solvent, then mix the various other constituents and the mill base.

The compositions of this invention have outstanding craze-resistance; articles coated therewith can be patched and refinished without any cracking appearing in the original dried methyl methacrylate lacquer. In addition to their outstanding craze-resistance, the dried compositions have outstanding outdoor durability and gloss retention and thus are particularly useful as decorative topcoats on steel automobile bodies. For such usage the compositions are preferably applied over previously applied coatings such as primers and undercoats and then dried. The topcoat can be air dried at room temperature, force dried, for example, for 30 minutes at 200° F. or subjected to mild baking conditions, for example 300° F. for 10 minutes.

The coating compositions of this invention can be used, if desired, directly on a bare substrate or under subsequently applied coatings. Also, they can be used on substrates other than steel which are not adversely affected by baking operations including glass, ceramics, asbestos, wood (when moderate baking temperatures are permissible) and metals such as aluminum, copper, magnesium and alloys thereof.

The following examples are intended to illustrate the invention and not to limit it in any way. Parts are by weight unless otherwise specified.

EXAMPLE I

*Preparation of polyester*

About 366 parts of adipyl chloride were added slowly over a period of 2 hours to a stirred mixture of 912 parts of bis-(4-hydroxylphenyl)-2,2-propane partially dissolved in 600 parts of toluene held at about 70° C. After all of the adipyl chloride was added, the reaction mixture was held at about 70° C. for an additional 4 hours until hydrochloric acid was no longer evolved from the reaction mixture. The resulting product contained about 66% by weight of solids.

*Preparation of methyl methacrylate lacquer*

A mill base was prepared by grinding 100 parts of carbon black pigment (Neospectra Mark II, a product of Columbian Carbon Company), with 15 parts of one-half second viscosity, lacquer-grade nitrocellulose and 200 parts of benzyl butyl phthalate on a rubber mill. This mill base was then diluted to about 20% solids with ethyl acetate.

A methyl methacrylate lacquer was prepared by thoroughly mixing 450 parts of the mill base with 637 parts of the polyester solution previously described, 3030 parts of a 40% solution of a homopolymer of methyl methacrylate in a tolueneacetone solvent (70/30 weight ratio), and 20 parts of benzyl butyl phthalate plasticizer. The resulting mixture had the following composition:

| | Parts |
|---|---|
| Homopolymer of methyl methacrylate | 60.5 |
| Plasticizer | 11.0 |
| Lacquer-grade nitrocellulose | 7.5 |
| Polyester | 21.0 |
| Pigment | 5.0 |
| Solvent | 201.0 |
| | 306.0 |

The homopolymer of methyl methacrylate used in this example had a relative viscosity of about 1.15 measured according to A.S.T.M.-D-445-46T, method B referred to hereinbefore.

*Preparation of coated article*

Steel auto-body panels treated with conventional rust inhibitor ("Bonderite," a product of Parker Rust-Proof Co.) were prime coated with a conventional primer containing about 52% by weight of soya oil modified glycerol phthalate resin as the film-former and baked for 15 minutes at 400° F. to give a dry coating about 0.5 mil thick. A sealer coat containing as the film-forming material in lacquer solvents 34% by weight of lacquer-grade nitrocellulose, 49% by weight of shellac, and 17% by weight of polyvinyl butyraldehyde resin ("Butvar" B-90, a product of Monsanto Chemical Co.), and pigment in amount corresponding to 28.5% by weight of the total organic film-forming material was applied over the prime coat.

The methyl methacrylate lacquer described above was thinned to about 18% by weight solids with solvent consisting of a mixture of Cellosolve acetate, acetone, isopropyl alcohol, xylene and butyl alcohol in about a 3:6:4:6:1 weight ratio and sprayed onto the previously prepared panels. Finally, the coated panels were baked at 93° C. for about 30 minutes. The resulting products had a topcoat of methyl methacrylate lacquer about 2 mils thick.

*Evaluation of coated panel*

The resistance to crazing of the methyl methacrylate topcoat was determined by spraying a conventional methacrylate lacquer (that is, for example, one containing about 71 parts of methyl methacrylate homopolymer, 29 parts of benzyl butyl phthalate, 5 parts of carbon black pigment and a solvent similar to that described in this example) over the baked methyl methacrylate lacquer topcoat and noting the appearance of cracks or craze marks in the surface of the coating.

The baked lacquer of this example showed no crazing when it was tested as described above at 15° C. at a relative humidity of 40%. The test was repeated after the panels had been baked 30 minutes at 93° C., 2 hours at 93° C. and 4 hours at 93° C. The baked coatings were free from crazing in each of the tests.

A baked topcoat of a conventional methyl methacrylate lacquer such as the one described above shows severe crazing in each of the aforementioned tests.

The baked methyl methacrylate topcoat of this example had an exceptionally good jet black color and was very suitable for topcoating automobile bodies.

EXAMPLE II

A polyester was prepared by adding 183 parts of adipyl chloride slowly over a period of 1 hour to a stirred mixture of 342 parts of bis-(4-hydroxyphenyl)-2,2-propane in 250 parts of toluene, then heating the mixture for 8 hours at 114° C. until essentially all of the hydrochloric acid by-product was evolved. A methyl methacrylate lacquer was formulated with this polyester, applied and tested as described in Example I. The resulting baked topcoat showed excellent craze resistance.

EXAMPLE III

Example I was repeated, however, an equal weight of a polymer of methyl methacrylate formed by copolymerizing 95 parts of methyl methacrylate with 5 parts of glycidyl methacrylate was substituted for the homopolymer of methyl methacrylate used in that example. The methyl methacrylate glycidyl methacrylate polymer had a relatively viscosity of about 1.14 determined as described hereinbefore. A baked topcoat of the resulting lacquer had the same excellent craze resistance as that shown by the products of the preceding examples.

If a copolymer of 98% by weight of methyl methacrylate and 2% by weight of methacrylic acid having a relative viscosity of from 1.117 to 1.196 is substituted for the homopolymer of methyl methacrylate in Example I, a lacquer having similar excellent craze resistance is obtained.

EXAMPLE IV

An ester was prepard by heating 456 parts of bis-(4-hydroxyphenyl)-2,2-propane with 240 parts of acetic anhydride in 150 parts of methyl isobutyl ketone for 5 hours at 115° C. During the reaction, the ketone solvent was distilled from the mixture with the acetic acid by-product, then separated from the acid and refluxed. Next, 146 parts of adipic acid was added to the mixture which was then heated for 3 hours at 140° C. Finally, the reaction temperature was raised to 220° C. and the reaction was continued until acetic acid was no longer evolved from the mixture.

The polyester just described was used in formulating two methyl methacrylate lacquers by the procedure shown in Example I. The lacquers had the following solids compositions:

| | Parts | |
|---|---|---|
| | Lacquer A | Lacquer B |
| Homopolymer of methyl methacrylate (Same as Example I) | 56.5 | 47.5 |
| Lacquer-grade nitrocellulose | 15.0 | 15.0 |
| Polyester (described above) | 28.5 | 37.5 |
| Carbon black pigment (Same as Example I) | 5.0 | 5.0 |
| | 105.0 | 105.0 |

These lacquers were diluted to about 18% solids with solvent and applied and dried as described in Example I. The resulting baked methyl methacrylate topcoats showed no crazing when a few drops of methyl isobutyl ketone were dropped onto the baked surface and allowed to evaporate at room temperature.

If the molecular equivalent of bis-(4-hydroxy-3-methylphenyl)-2,2-propane or bis-(4-hydroxyphenyl)-2,2-butane is substituted for the bis-(4-hydroxylphenyl)-2,2-propane in preparing the polyesters described in this and the preceding examples, methyl methacrylate lacquers made from the resulting polyesters have the same excellent craze-resistance as that described hereinbefore.

EXAMPLE V

A polyester was prepared from bis-(4-hydroxyphenyl)-2,2-propane, azelaic acid and acetic anhydride by the procedure shown in Example IV. A methyl methacrylate lacquer was prepared with this polyester by the procedure shown in Example I. The lacquer had the following constituents:

| | Parts |
|---|---|
| Homopolymer of methyl methacrylate | 55 |
| Lacquer-grade nitrocellulose | 7.5 |
| Benzyl butyl phthalate | 10 |
| Polyester (described above) | 27.5 |
| Pigment (same as Example I) | 5 |
| Solvent: | |
| Xylene | 103 |
| Toluene | 103 |
| Acetone | 206 |
| Cellosolve acetate | 103 |
| | 620.0 |

This lacquer was applied to primed and sealed steel panels similar to those described in Example I, then baked at 93° C. for about 30 minutes. The resulting products had excellent craze resistance.

EXAMPLE VI

A diacetate was prepared by heating 604 parts of bis-(4-hydroxyphenyl)-2,2-propane with 644 parts of acetic anhydride and 2 parts of sodium acetate for 2 hours at about 118° C. During the reaction the excess acetic anhydride and the acetic acid by-product were distilled from the reaction mixture. The diester was next converted to the monoester by adding 604 more parts of bis-(4-hydroxyphenyl)-2,2-propane to the mixture and holding the resulting reaction mixture at 150° C. for an additional 2 hours. Finally, a polyester was prepared by adding 386 parts of adipic acid to the monoacetate and holding the reactants at about 230° C. until acetic acid was no longer evolved.

The resulting polyester was used to formulate methyl methacrylate lacquers similar to those described in Example IV. When these lacquers were applied to steel panels and dried as described in Example I, they showed excellent craze resistance.

I claim:

1. A coating composition comprising solvent and (A) about from 40 to 75 parts by weight of a polymer of methyl methacrylate having a relative viscosity of about from 1.117 to 1.196, (B) up to about 25 parts by weight of plasticizer for said polymer of methyl methacrylate, (C) about from 5 to 20 parts by weight of lacquer-grade nitrocellulose and (D) about from 20 to 50 parts by weight of the heat reaction product of 1 molar portion of at least one of the group consisting of aliphatic dicarboxylic acids having 4 to 10 carbon atoms and acid chlorides and anhydrides thereof with at least about 1.5 molar portions of at least one compound which forms an ester therewith selected from the group consisting of bisphenols and acetates thereof, said bisphenols having the formula:

wherein $R_1$ is selected from the class consisting of hydrogen and alkyl radicals of from 1 to 4 carbon atoms, $R_2$ is selected from the class consisting of hydrogen, cyclohexyl and alkyl radicals of from 1 to 4 carbon atoms and $R_3$ and $R_4$ are selected from the class consisting of hydroxyphenyl radicals and monoalkylated hydroxyphenyl radicals having 1 to 3 carbon atoms per alkyl group, said polymer of methyl methacrylate being at least one material selected from the group consisting of homopolymers of methyl methacrylate and copolymers of methyl methacrylate with about from 2 to 25% by weight of at least one of the group consisting of acrylic acid, methacrylic acid, the 1 to 4 carbon alkyl esters of acrylic acid, the 2 to 4 carbon alkyl esters of methacrylic acid, vinyl acetate, acrylonitrile, styrene and glycidyl methacrylate, said relative viscosity of said polymer of methyl methacrylate being the quotient obtained by dividing the efflux time of a solution of 0.25 gram of said polymer of methacrylate in 50 milliliters of ethylene dichloride by the efflux time of ethylene dichloride, said efflux times being measured in accordance with the procedure of A.S.T.M. D-445-46T, method B at 25° C. using a modified Ostwald viscosimeter, series 50.

2. A coating composition comprising solvent and (A) about from 50 to 70 parts by weight of a polymer of methyl methacrylate having a relative viscosity of about from 1.117 to 1.196, (B) about from 10 to 20 parts by weight of plasticizer for said polymer of methyl methacrylate, (C) about from 5 to 10 parts by weight of lacquer-grade nitrocellulose and (D) about from 20 to 30 parts by weight of the reaction product of 1 molar portion of at least one of the group consisting of aliphatic dicarboxylic acids having 4 to 10 carbon atoms and acid chlorides and anhydrides thereof with about from 1.5 to 2.0 molar portions of at least one compound which forms an ester therewith selected from the group consisting of bisphenols and acetates thereof, said bisphenols having the formula:

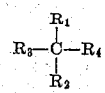

wherein $R_1$ is selected from the class consisting of hydrogen and alkyl radicals of from 1 to 4 carbon atoms, $R_2$ is selected from the class consisting of hydrogen, cyclohexyl and alkyl radicals of from 1 to 4 carbon atoms and $R_3$ and $R_4$ are selected from the class consisting of hydroxyphenyl radicals and monoalkylated hydroxyphenyl radicals having 1 to 3 carbon atoms per alkyl group, said polymer of methyl methacrylate being at least one material selected from the group consisting of homopolymers of methyl methacrylate and copolymers of methyl methacrylate with about from 2 to 25% by weight of at least one of the group consisting of acrylic acid, methacrylic acid, the 1 to 4 carbon alkyl esters of acrylic acid, the 2 to 4 carbon alkyl esters of methacrylic acid, vinyl acetate, acrylonitrile, styrene and glycidyl methacrylate, said relative viscosity of said polymer of methyl methacrylate being the quotient obtained by dividing the efflux time of a solution of 0.25 gram of said polymer of methacrylate in 50 milliliters of ethylene dichloride by the efflux time of ethylene dichloride, said efflux times being measured in accordance with the procedure of A.S.T.M. D-445-46T, method B at 25° C. using a modified Ostwald viscosimeter, series 50.

3. A coating composition comprising solvent and (A) about from 50 to 70 parts by weight of a polymer of methyl methacrylate having a relative viscosity of about from 1.117 to 1.196, (B) about from 10 to 20 parts by weight of plasticizer for said polymer of methyl methacrylate, (C) about from 5 to 10 parts by weight of lacquer-grade nitrocellulose and (D) about from 20 to 30 parts by weight of the reaction product of 1 molar portion of at least one of the group consisting of aliphatic dicarboxylic acids having 4 to 10 carbon atoms and acid chlorides and anhydrides thereof with about from 1.5 to 2.0 molar portions of at least one compound which forms an ester therewith selected from the group consisting of bis-(4-hydroxyphenyl)-2,2-propane and acetates thereof, said polymer of methyl methacrylate being at least one material selected from the group consisting of homopolymers of methyl methacrylate and copolymers of methyl methacrylate with about from 2 to 25% by weight of at least one of the group consisting of acrylic acid, methacrylic acid, the 1 to 4 carbon alkyl esters of acrylic acid, the 2 to 4 carbon alkyl esters of methacrylic acid, vinyl acetate, acrylonitrile, styrene and glycidyl methacrylate, said relative viscosity of said polymer of methyl methacrylate being the quotient obtained by dividing the efflux time of a solution of 0.25 gram of said polymer of methacrylate in 50 milliliters of ethylene dichloride by the efflux time of ethylene dichloride, said efflux times being measured in accordance with the procedure of A.S.T.M. D–445–46T, method B at 25° C. using a modified Ostwald viscosimeter, series 50.

4. A coating composition comprising carbon black pigment, solvent and (A) about from 50 to 70 parts by weight of a polymer of methyl methacrylate having a relative viscosity of about from 1.117 to 1.196, (B) about from 10 to 20 parts by weight of plasticizer for said polymer of methyl methacrylate, (C) about from 5 to 10 parts by weight of lacquer-grade nitrocellulose and (D) about from 20 to 30 parts by weight of the reaction product of 1 molar portion of at least one of the group consisting of aliphatic dicarboxylic acids having 4 to 10 carbon atoms and acid chlorides and anhydrides thereof with about from 1.5 to 2.0 molar portions of at least one compound which forms an ester therewith selected from the group consisting of bisphenols and acetates thereof, said bisphenols having the formula:

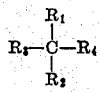

wherein $R_1$ is selected from the class consisting of hydrogen and alkyl radicals of from 1 to 4 carbon atoms, $R_2$ is selected from the class consisting of hydrogen, cyclohexyl and alkyl radicals of from 1 to 4 atoms and $R_3$ and $R_4$ are selected from the class consisting of hydroxyphenyl radicals and monoalkylated hydroxyphenyl radicals having 1 to 3 carbon atoms per alkyl group, said polymer of methyl methacrylate being at least one material selected from the group consisting of homopolymers of methyl methacrylate and copolymers of methyl methacrylate with about from 2 to 25% by weight of at least one of the group consisting of acrylic acid, methacrylic acid, the 1 to 4 carbon alkyl esters of acrylic acid, the 2 to 4 carbon alkyl esters of methacrylic acid, vinyl acetate, acrylonitrile, styrene and glycidyl methacrylate, said relative viscosity of said polymer of methyl methacrylate being the quotient obtained by dividing the efflux time of a solution of 0.25 gram of said polymer of methacrylate in 50 milliliters of ethylene dichloride by the efflux time of ethylene dichloride, said efflux times being measured in accordance with the procedure of A.S.T.M. D–445–46T, method B at 25° C. using a modifier Ostwald viscosimeter, series 50.

5. An article having a dried coating of the composition of claim 1.

6. A process which comprises forming a polyester reaction product by heating 1 molar portion of at least one of the group consisting of aliphatic dicarboxylic acids having 4 to 10 carbon atoms and acid chlorides and anhydrides thereof with about from 1.5 to 2.0 molar portions of at least one compound which forms an ester therewith selected from the group consisting of bisphenols and acetates thereof, said bisphenols having the formula:

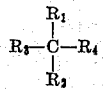

wherein $R_1$ is selected from the class consisting of hydrogen and alkyl radicals of from 1 to 4 carbon atoms, $R_2$ is selected from the class consisting of hydrogen, cyclohexyl and alkyl radicals of from 1 to 4 carbon atoms and $R_3$ and $R_4$ are selected from the class consisting of hydroxyphenyl radicals and monoalkylated hydroxyphenyl radicals having 1 to 3 carbon atoms per alkyl group, and blending about from 20 to 50 parts by weight of said polyester reaction product with solvent, about from 40 to 75 parts by weight of a polymer of methyl methacrylate having a relative viscosity of about from 1.117 to 1.196, up to about 25 parts by weight of plasticizer for said polymer of methyl methacrylate and about from 5 to 20 parts by weight of laquer-grade nitrocellulose, said polymer of methyl methacrylate being at least one material selected from the group consisting of homopolymers of methyl methacrylate and copolymers of methyl methacrylate with about from 2 to 25% by weight of at least one of the group consisting of acrylic acid, methacrylic acid, the 1 to 4 carbon alkyl esters of acrylic acid, the 2 to 4 carbon alkyl esters of methacrylic acid, vinyl acetate, acrylonitrile, styrene and glycidyl methacrylate, said relative viscosity of said polymer of methyl methacrylate being the quotient obtained by dividing the efflux time of a solution of 0.25 gram of said polymer of methacrylate in 50 milliliters of ethylene dichloride by the efflux time of ethylene dichloride, said efflux times being measured in accordance with the procedure of A.S.T.M. D–445–46T, method B at 25° C. using a modified Ostwald viscosimeter, series 50.

7. The process of claim 6 wherein said polyester reaction product is formed by heating 1 molar portion of the acid chloride of an aliphatic dicarboxylic acid having 4 to 10 carbon atoms with about from 1.5 to 2 molar portions of one of said bisphenols at about 50 to 120° C. until said reaction is substantially completed.

8. The process of claim 6 wherein said polyester reaction product is formed by heating 1 molar portion of an aliphatic dicarboxylic acid having 4 to 10 carbon atoms with about from 1.5 to 2.0 molar portions of the monoacetate of one of said bisphenols at a temperature of about from 150 to 220° C. until said reaction is substantially completed.

References Cited in the file of this patent

UNITED STATES PATENTS

| | | |
|---|---|---|
| 2,068,634 | Bruson et al. | Jan. 19, 1937 |
| 2,069,983 | Ubben | Feb. 9, 1937 |
| 2,139,008 | Ensminger | Dec. 6, 1938 |
| 2,191,530 | Hucks | Feb. 27, 1940 |